United States Patent

Ecke et al.

[11] Patent Number: 5,953,122
[45] Date of Patent: Sep. 14, 1999

[54] METHOD AND APPARATUS FOR INCREASING THE STABILITY OF A FIBER OPTIC GYROSCOPE BY CONTROLLING THE PHASE AND AMPLITUDE OF THE SOURCE MODULATING CURRENT

[75] Inventors: Wolfgang Ecke, Jena; Eberhard Handrich, Kirchzarten; Klaus Hilpert, Mannheim; Michael Newkirch, Edingen, all of Germany

[73] Assignee: Litef GmbH, Germany

[21] Appl. No.: 08/904,099

[22] Filed: Jul. 31, 1997

[51] Int. Cl.[6] ..................................................... G01C 19/72
[52] U.S. Cl. ............................................................ 356/350
[58] Field of Search .............................................. 356/350

[56] References Cited

U.S. PATENT DOCUMENTS 4,842,358  6/1989  Hall ........................................... 356/350
4,875,775  10/1989  Michal et al. ............................ 356/350
5,184,195  2/1993  Goldner ................................... 356/350

FOREIGN PATENT DOCUMENTS 0235719  10/1986  Japan ...................................... 356/350

Primary Examiner—Samuel A. Turner
Attorney, Agent, or Firm—Elliott N. Kramsky

[57] ABSTRACT

A small modulation current is applied to the light source of a Sagnac-type fiber optic gyroscope to increase accuracy and/or stability of scale factor (open loop configuration) and to reduce bias errors and random walk (closed-loop configuration). The phase and amplitude of the modulation current are controlled through a control circuit whose reference is picked off at a first beamsplitter in series with the light source. In such a way, light emitted from the light source into the interferometer contains no modulation. The elimination of modulation removes a source that would otherwise cause deterioration of gyroscope stability resulting from light returning from the interferometer or due to electrical interference, thus limiting measurement accuracy.

2 Claims, 3 Drawing Sheets

METHOD AND APPARATUS FOR INCREASING THE STABILITY OF A FIBER OPTIC GYROSCOPE BY CONTROLLING THE PHASE AND AMPLITUDE OF THE SOURCE MODULATING CURRENT

BACKGROUND

1. Field of the Invention

The present invention relates to methods and apparatus for improving the performance of a Sagnac-type fiber optic gyroscope. More particularly, the invention pertains to the improvement of scale factor stability in an open loop gyroscope and reduction of zero point drift and random walk in a closed loop gyro.

2. Description of the Prior Art

The present invention relates to fiber optic interferometers such as fiber optic gyroscopes for determining rotation rates, wherein light from a (preferably stabilized) light source such as a laser diode (LD) or a superluminescence diode (SLD) is irradiated, after two beam splittings, with like light intensities into the two ends of a fiber coil. After having passed through the coil (usually of polarization or non-polarization maintaining monomode fiber), the two light portions are superimposed to interfere at the second beamsplitter which constitutes the "main" beamsplitter. Upon return through a polarizer, optimally half the portion of the interfering light is decoupled at the first beamsplitter located near to the light source. This decoupled light is applied to a photodetector whose output signal, after amplification and A/D conversion, is subjected to frequency analysis and signal processing to obtain a rotation rate signal.

Fiber optic interferometers, particularly rotation rate sensors possessing this basic structure, are known in both open loop and closed-loop configurations. It is known to phase-modulate the light counterpropagating within the fiber coil so that the working point for signal measurement is always in the characteristic range of maximum measuring signal change per rotation rate change to increase accuracy of measurement. Modulation may be periodic or according to a statistical scheme.

FIG. 2 is a schematic diagram of a known open loop Sagnac-type fiber optic gyroscope configuration. Light, from a source 1 such as a super luminescent diode (LSD) that is stabilized in intensity and wavelength, is transmitted along a fiber path to a first beamsplitter 2, through a polarizer 3 and to a second "main" beamsplitter 4. The component beams produced by beam splitting enter the two inputs/outputs of a fiber coil 6 from the two inputs/outputs remote from the light source 1. Thereafter, a depolarizer 5 and a phase modulator 7 are provided between the inputs/outputs of the main beamsplitter 4 and the inputs/outputs of the fiber coil 6. In the event that non-polarization maintaining monomode fiber is employed, the depolarizer 5 acts to insure interference of the light. Such apparatus is omitted when polarization-maintaining monomode fiber is employed.

The phase modulator 7 is activated by a modulation oscillator 8 for periodically (or, according to a known quasi-stochastic modulation method) shifting the phase of the light provided for signal processing to a working point of maximum sensitivity of rotation of the fiber coil 6 about its axis. The beams interfering in the main beamsplitter 4 after having passed through the fiber coil 6 pass through the polarizer 3 with an optimum portion (one half) conducted through the first beamsplitter 2 to a photodetector 9 whose output signal is amplified and filtered in a predetermined way at 10, then digitized at 11 and subsequently subjected to frequency analysis at 12 and signal analysis at 13 to obtain the rate of rotation signal $\Omega$.

The accuracy of a fiber optic gyroscope—particularly in open loop configuration—depends, inter alia, on scale factor stability. Such scale factor and its stability are dependent, among other things, on the properties of the light source 1. In order to stabilize the light source 1 with respect to its zero point and wavelength variations despite the influences of such factors as the environment, fluctuations due to aging and fabrication, considerable efforts have been exerted as taught by DE 40 37 118 C1, DE 38 05 915 C2 and EP 0 611 950 B1, for example.

Despite such efforts, it has been found that such efforts for stabilizing the light source 1 and for compensation of light source wavelength variations respectively are inadequate to maintain scale factor sufficiently stable—insofar as it is influenced by the light source 1 when a specific measuring accuracy is required.

In a closed-loop configuration, basically two influencing magnitudes cause special accuracy problems. These are zero point drift (bias drift) and signal noise (random walk) in the measuring signal. Such factors are caused mainly by the electrical control of the light source and by crosstalk of the modulation voltage into the light source electronics at the I/O chip.

SUMMARY AND OBJECTS OF THE INVENTION

It is therefor the object of the present invention to improve the stability of scale factor of a Sagnac-type fiber optic interferometer—particularly in open-loop configuration—and the reproducible accuracy of a fiber optic gyroscope in closed-loop configuration with regard to the influences of zero point drift and random walk.

The present invention addresses the preceding objects by providing, in a first aspect, a method for increasing the stability of a d.c.-excited Sagnac-type fiber optic gyroscope including a light source and an interferometer for receiving light output from such source. Such method includes the steps of applying a small modulating current to the light source and controlling the phase of the modulating current so that the light emitted from the light source into the interferometer is unmodulated.

In a second aspect, the invention provides an improvement in a Sagnac-type fiber optic gyroscope of the type that includes a light source, a first and a second beamsplitter, a fiber coil coupled to the outputs of the first and second beamsplitters remote from the light source, a phase modulator for applying a modulating signal to one end of the fiber coil and an evaluation detector connected to one output of the first beamsplitter to detect the interfering light returning from the fiber coil. The output of the detector is coupled to a frequency analyzing and signal processing circuit for providing a rate of rotation.

The improvement provided by the second aspect of the invention includes an additional detector coupled to another output/input of the first beamsplitter. Such initial detector is arranged so that its output signal is supplied, after amplification, as a presetting signal to an input of an amplification and controlling circuit. The output of the amplification and controlling circuit is applied as a modulating current to the light source. Means are provided for adjusting the phase and amplitude of the modulating current so that the light emitted from the source to the interferometer contains no modulation.

DETAILED DESCRIPTION OF THE PREFERRED EMBODIMENT

Figure 1:
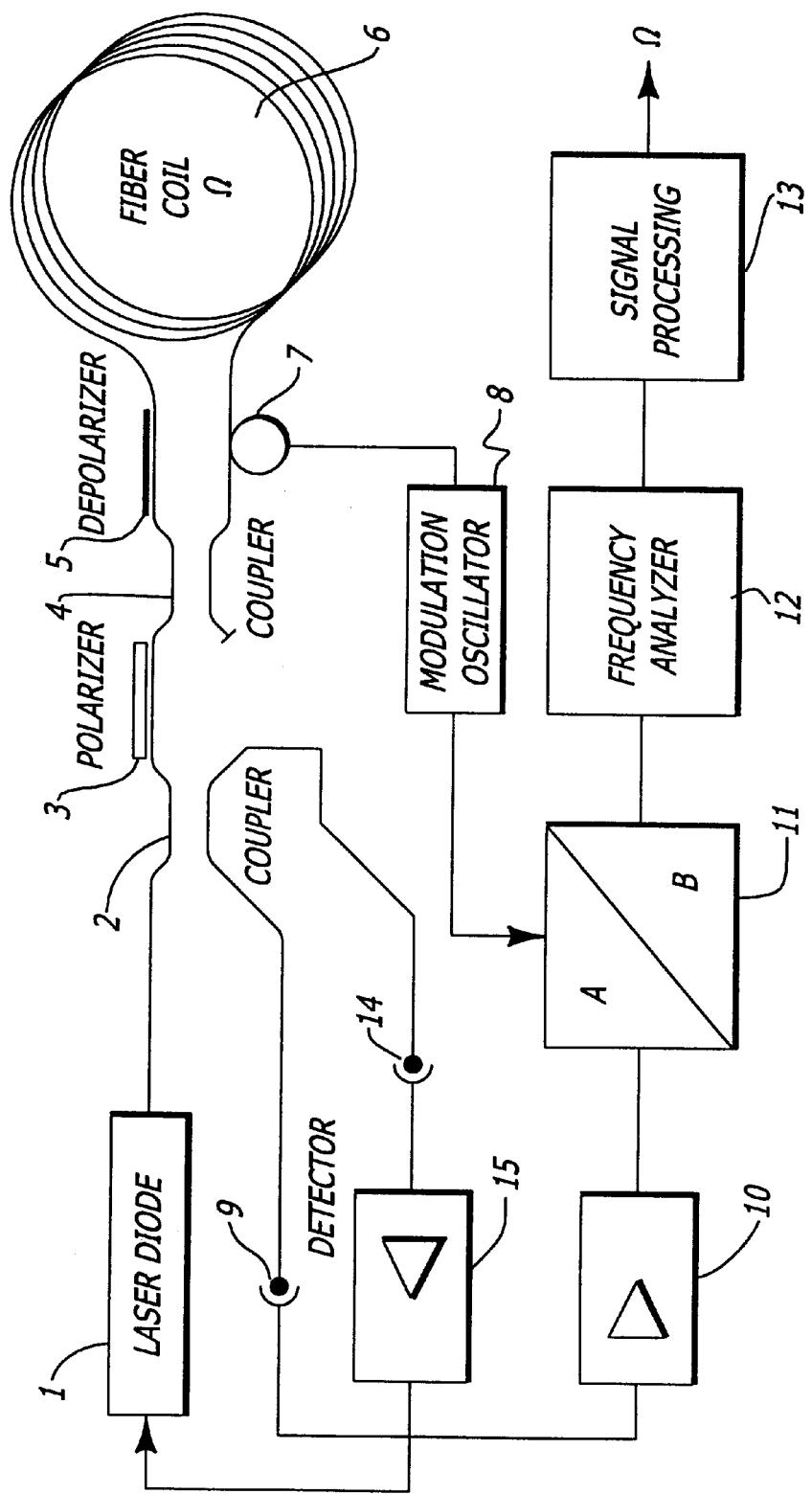
FIG. 1 is a schematic diagram illustrating the basic structure of a Sagnac-type fiber optic gyroscope in open loop configuration for demonstrating control of the light source in accordance with the present invention.
Figure 2:
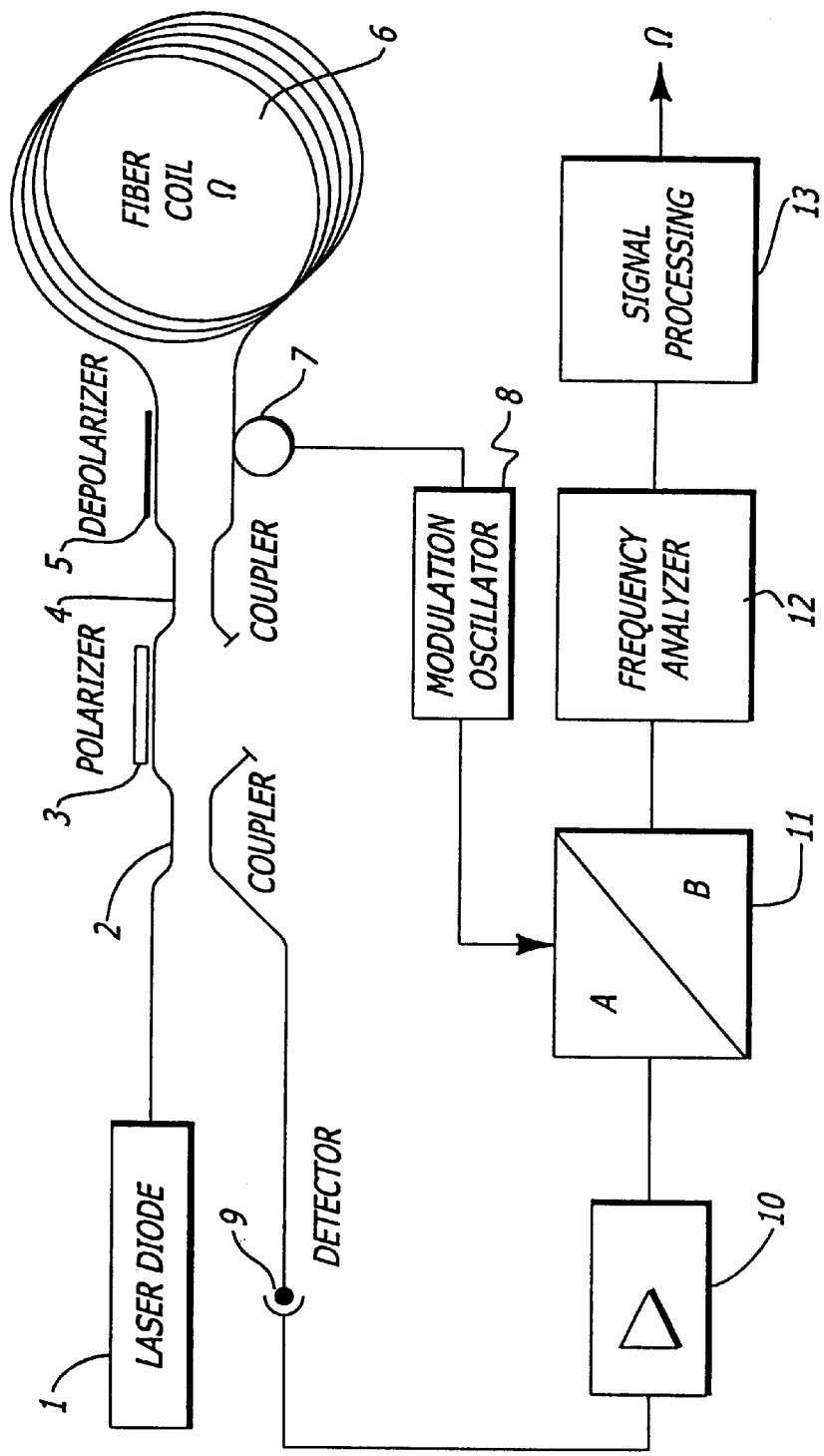
FIG. 2 is a schematic diagram of a fiber optic gyroscope in open-loop configuration in accordance with the prior art.

FIG. 1 is a schematic diagram illustrating the basic structure of a Sagnac-type fiber optic gyroscope in open loop configuration in accordance with the invention. Elements, sections and modes of operation of the apparatus illustrated in FIG. 1 which have already been explained with reference to the prior art apparatus of FIG. 2 are not enumerated or further explained in the discussion that follows.

As mentioned earlier, it is a goal of the invention to eliminate or at least considerably reduce light modulations, particularly those that enter the interferometer, with respect to the portions of modulated light and their influence upon the accuracy of scale factor stability and zero point as well as the influences of random walk. That is, it is an object of the invention to insure that disturbing modulating light does not enter the interferometer.

In accordance with the above, the invention as illustrated in FIG. 1 provides a loop for influencing the light source 1 as well as an additional detector 14 having a reference or drive signal that is picked off at an otherwise-non utilized ("free") input/output of the first beamsplitter or coupler 2. The output of the added detector 14 supplies—after filtering and/or amplification at 15—a modulation portion that is small in comparison to the d.c. current that excites the light source 1 (e.g. a laser diode). The modulation and phase of the output of the detector 14 are set so that the light emitted from the light source 1 into the optical fiber and, thus, into the interferometer, will contain no modulated portion.

The inventors have observed that light returning from the interferometer, partly reflected and returning to the interferometer once again, causes a deterioration in the scale factor. Such backscattering or reflection can take place at the light source and/or at the detector, for example, depending upon the structure. Backscattering at the light source is unavoidable in most cases (e.g. by influencing the emitted light power by means of the light coming back from the interferometer.) Thus, the portion of modulated light scattered back (e.g. from the light source) to the interferometer must be eliminated, either through suppression or by compensation. A further cause of light modulation in compact arrangements has been found to be unavoidable cross-talk of the modulation voltage into the light source electronics resulting in a modulation of the light intensity.

Based on this insight, the inventors have recognized that the scale factor stability may be increased in open loop fiber optic gyroscopes by applying a small modulating current to the light source whose phase is controlled so that the light passing through the interferometer remains unmodulated and thus contains no modulated portion. The phase and amplitude of the modulating current are controlled to achieve such result.

In closed-loop fiber optic gyroscopes with signal reset, a considerable reduction of the zero point drift and/or random walk can be achieved by employing the same principle of compensating modulation of the light source.

Figure 3:
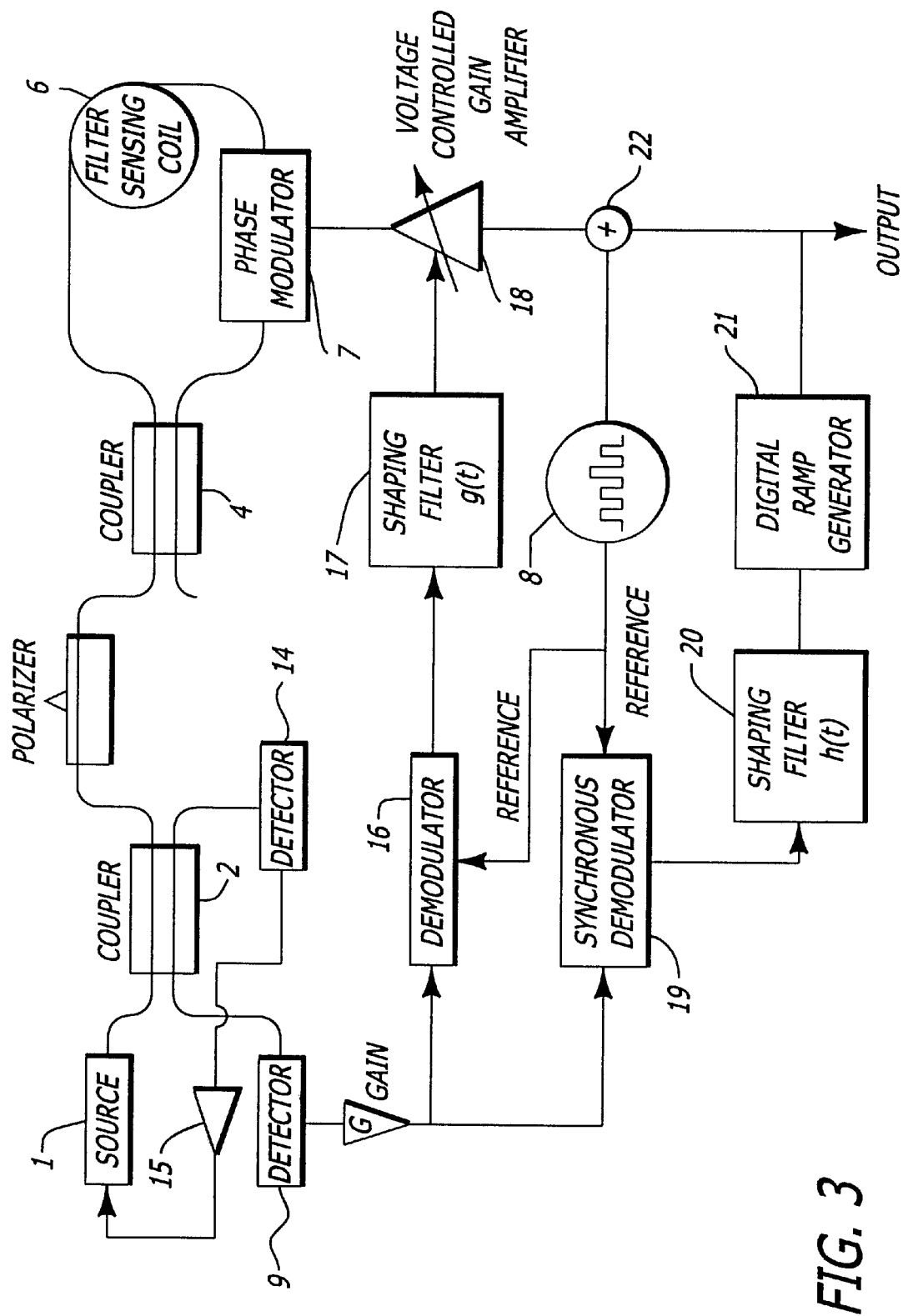
FIG. 3 is a schematic diagram of a Sagnac-type fiber optic gyroscope in closed-loop configuration with digital reset and control of the light source in accordance with the present invention.

FIG. 3 is schematic diagram of a Sagnac-type fiber optic gyroscope in closed-loop configuration with digital reset and control of the light source in accordance with the present invention. Again, modules and components possessing like or similar functions to those previously disclosed with reference to FIGS. 1 and 2 that are employed in the arrangement of FIG. 3 but without reset are denoted by like reference characters so that no further explanation is required.

A scale factor control path including a demodulator 16 and an amplification filter 17 whose output determines the gain factor of a controllable amplifier 18 for driving the phase modulator 7 comprises a part of the modules of the closed-loop fiber optic gyroscope structure of FIG. 3. The modulation oscillator 8 supplies modulation patterns of different levels. A modulo-$2\pi$ phase shift supplies the reference for the demodulator 16 while a modulo-$\pi/2$ phase shift supplies the reference for a sync demodulator 19 whose output signal provides the reset or rate of rotation signal $\Delta\Omega$ respectively through an amplification filter 20 and a digital ramp generator 21. The modulating signal of the modulating oscillator 8 which determines the working point and the reset signal from the digital ramp generator 21 are combined in an adder 22 whose output is applied to the controllable amplifier 18.

The scale factor of a fiber optic gyroscope with digital reset (i.e. closed-loop) is significantly influenced by the phase modulator that resets the Sagnac phase and whose control signal is readjusted by the controllable amplifier 18. Thus, the influence of light modulation on the scale factor is negligible. However, light source modulations can cause zero point drift in the presence of periodic modulation and an increase in noise (i.e. random walk) in the presence of statistical modulation. Generally, direct couplings of the modulator voltages into the light source electronics dominate.

To overcome the above difficulties, the present invention provides in the closed-loop configuration of FIG. 3, an additional detector 14 disposed at an output/input of the first beamsplitter 2 for applying a small modulating signal, after filtering and amplification at 15 to the light source 1 so that light modulation and, thus, possible signal noise and zero point errors, respectively, can be compensated.

Successful tests have proved that, based upon the invention, it is possible to fabricate open-loop fiber optic gyroscopes with considerably improved scale factor accuracy at relatively little additional cost. In closed-loop fiber optic gyroscopes with reset, the influences of random walk are reduced and zero point stability is improved. In comparison with other known or proposed solutions, the total cost for a fiber optic gyroscope of very high accuracy can be reduced.

Thus it is seen that the present invention provides a method and apparatus for increasing the stability of a fiber optic gyroscope. By employing the teachings of this invention, significant advantages may be realized in Sagnac interferometers of both open and closed-loop configurations.

While this invention has been disclosed with reference to its presently-preferred embodiment, it is not limited thereto. Rather, the scope of this invention is limited only insofar as it is defined by the following set of patent claims and includes within its scope all equivalents thereof.

What is claimed is:

1. A method for increasing the stability of a Sagnac-type fiber optic gyroscope including a d.c. excited light source and an interferometer for receiving light output from said source, said method comprising the steps of:

a) applying a small modulating current to said light source; and b) controlling the phase and the amplitude of said modulating current in accordance with the type of light source employed so that the light emitted from said light source into said interferometer is unmodulated.

2. In a Sagnac-type fiber optic gyroscope of the type that includes a light source, a first and a second beamsplitter, a fiber coil coupled to the outputs of said first and second beamsplitters remote from said light source, a phase modulator for applying a modulating signal to one end of said fiber coil and an evaluation detector connected to one input of said first beamsplitter to detect the interfering light returning from said fiber coil whose output is coupled to a frequency analyzing and signal processing circuit for providing a rate of rotation, the improvement comprising:

a) an additional detector coupled to another output/input of said first beamsplitter;

b) said additional detector being arranged so that its output signal is supplied, after amplification, as a presetting signal to an input of an amplification and controlling circuit whose output is applied as a modulating current to said light source; and c) means for adjusting the phase and amplitude of said modulating current so that the light emitted from said source to said interferometer contains no modulation.

* * * * *